United States Patent [19]
Roseburg

[11] Patent Number: 5,518,208
[45] Date of Patent: May 21, 1996

[54] OPTIMUM AIRCRAFT BODY FRAME TO BODY SKIN SHEAR TIE INSTALLATION PATTERN FOR BODY SKIN/STRINGER CIRCUMFERENTIAL SPLICES

[75] Inventor: Lawrence E. Roseburg, Bellevue, Wash.

[73] Assignee: The Boeing Company, Seattle, Wash.

[21] Appl. No.: 174,477

[22] Filed: Dec. 28, 1993

[51] Int. Cl.[6] .................................. B64C 1/06; B64C 1/12
[52] U.S. Cl. ........................ 244/132; 244/119; 244/120; 244/131; 52/729.1
[58] Field of Search ................................ 244/117 R, 119, 244/120, 129.1, 131, 132; 105/399, 407, 411; 52/729, 737, 738, 739, 730.6

[56] References Cited

U.S. PATENT DOCUMENTS

| | | | |
|---|---|---|---|
| 890,545 | 6/1908 | Wilson | 52/739 |
| 1,749,757 | 3/1930 | Carns | 244/119 |
| 2,276,391 | 3/1942 | Hathorn | 244/117 R |
| 2,327,636 | 8/1943 | Gerber | 244/120 |
| 2,639,788 | 5/1953 | Korsberg et al. | 244/131 |
| 2,945,653 | 7/1960 | Atkin | 244/119 |
| 3,600,016 | 8/1971 | Dilley | 287/189.35 |
| 4,152,873 | 5/1979 | Burke | 52/729 |
| 4,310,132 | 1/1982 | Robinson et al. | 244/119 |
| 4,353,192 | 10/1982 | Pearson | 52/729 |
| 4,866,899 | 9/1989 | Houser | 52/481 |
| 4,904,109 | 2/1990 | Anderson | 244/132 |

FOREIGN PATENT DOCUMENTS

| | | | |
|---|---|---|---|
| 483656 | 3/1927 | Germany | 52/729 |
| 150646 | 9/1937 | Germany | 244/119 |
| 706014 | 3/1941 | Germany | 244/119 |
| 6717384 | 1/1969 | Netherlands | 52/729 |

Primary Examiner—Andres Kashnikow
Assistant Examiner—VirnaLissi Mojica
Attorney, Agent, or Firm—Dellett and Walters

[57] ABSTRACT

An aircraft construction which enables visual inspection of critical body skin/stringer circumferential splice failure lines from the interior of an aircraft comprises a bulkhead member with an alternating shear tie foot pattern such that in alternating stringer bays the critical failure path along one skin portion of the aircraft is not obscured by the bulkhead shear ties. The skin joint for an adjacent skin is similarly provided with an alternating shear tie foot pattern offset by one stringer bay from the pattern for the first skin such that the critical failure path on the opposite side of the bulkhead member is also visible in alternate stringer bays.

7 Claims, 5 Drawing Sheets

OPTIMUM AIRCRAFT BODY FRAME TO BODY SKIN SHEAR TIE INSTALLATION PATTERN FOR BODY SKIN/STRINGER CIRCUMFERENTIAL SPLICES

BACKGROUND OF THE INVENTION

This invention pertains to the manufacture of aircraft and more particularly to the optimum aircraft body frame to body skin shear tie installation pattern for body skin/stringer circumferential splices.

The body of an aircraft is typically constructed as a series of spaced circumferential bulkhead members which define the general cross sectional shape of the aircraft, with a series of spaced stringer members running longitudinally with respect to the aircraft body between bulkhead members. The bulkhead members and stringers provide support for the aircraft skin which is formed of a series of separate pieces applied over the various members and joined together with skin splice plates. The skin and splice plates fasten to the bulkhead members via shear ties which transfer load from the aircraft skin into the aircraft body frame. The areas where the skin splice plates are joined to the skin and the shear ties are critical fatigue points subject to potential failure.

Referring now to FIG. 5, which is a view of a bulkhead member and stringer together with splice plate in accordance with the prior art, a bulkhead member 12 defines the general cross sectional shape of the aircraft. Each bulkhead member comprises a series of shear ties 14 formed as flanges having a rectangular inverted "tee" footprint. The bulkhead includes openings 16 between adjacent shear ties 14 such that an individual stringer member 18 passes through each opening. Each opening 16 has a corresponding stringer 18 that passes therethrough; however, for clarity only one stringer is illustrated in FIG. 5. A substantially planar splice plate 20 is located between the bulkhead member shear ties and the aircraft skin and serves to join first skin portion 22 and adjacent second skin portion 24. A series of rivets or other suitable fasteners 26 are provided to join the splice plate and the skin to bulkhead member shear ties 14, thereby ensuring that the skin is securely attached to the plane. Stringer 18 is held to bulkhead member 12 via stringer hanger 28 wherein the stringer hanger 28 attaches to both bulkhead member 12 and stringer 18. An upper portion of stringer hanger 28 is riveted or otherwise attached to the bulkhead member while a lower foot portion 28' is similarly attached to the stringer member 18.

Since the skin splice locations are critical fatigue points, it is desirable to enable easy inspection of such joints so that throughout the life of an aircraft, any potential failures may be identified early and repaired before catastrophic failure occurs. An ideal damage tolerant structure should be provided so that failure initiation and propagation is not concealed, and which is accessible for visual inspection, thereby avoiding the use and resultant expense of non destructive inspection (NDI) methods. The two most likely failure points are illustrated as cracks or failure lines 30 and 30' running along each side of central web 13 of circumferential bulkhead member 12, substantially in line with the rows of fasteners 26 which are nearest the central web. In the construction according to the prior art shown in FIG. 5, visual inspection for potential failure (crack 30 or 30') from within the interior of the aircraft is not possible since the potential failure lines 30 and 30' are hidden from view by shear tie members 14. Also, while the failure line could potentially be visible in area 32 between the shear tie members near openings 16, the placement of stringers 18 prevents such viewing, since each stringer 18 substantially covers the areas 32 between shear tie members 14, blocking the view of the skin splice plate from within the aircraft fuselage. Therefore, in order to adequately inspect for potential failures, expensive non destructive inspection (NDI) methods are required. For example, X-ray or eddy current testing would be necessary to locate such potential failure problems. Such added expensive testing or inspecting makes such inspections less likely to be performed with great frequency or leads to excessive aircraft down time to accomplish the testing.

In efforts to avoid the inspection problems noted hereinabove, previous aircraft designs attempted to make the skin splices fatigue critical in the skin fasteners (e.g. rivets 26) but such a philosophy led to heavy splices (weight reduction is important in aircraft manufacture) and were not successful, since fatigue cracking still occurred in areas inaccessible for visual inspection (i.e. under the shear ties).

SUMMARY OF THE INVENTION

In accordance with the preferred embodiment of the invention, an optimum aircraft body frame to body skin shear tie installation pattern employs a bulkhead frame with an alternating shear tie member pattern such that the bulkhead frame shear tie member is present in alternating stringer bays on the forward side of the bulkhead frame central web member, but is absent from the corresponding aft side of the bulkhead frame member. Similarly, in the alternate stringer bays where the shear tie member is absent from the forward side of the bulkhead member, the shear tie is present on the aft side of the bulkhead member.

It is accordingly an object of the present invention to provide an improved installation pattern for body skin/stringer circumferential splices.

It is another object of the present invention to provide an improved aircraft wherein critical failure points are easily inspected visually to allow early detection of skin splice failures.

It is a further object of the present invention to provide an improved aircraft wherein skin splice failures may be detected without requiring expensive non destructive inspection methods.

It is yet another object of the present invention to provide an improved shear tie for an aircraft with enhanced inspection characteristics to meet damage tolerance requirements while at the same time offering a light-weight skin splice design.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
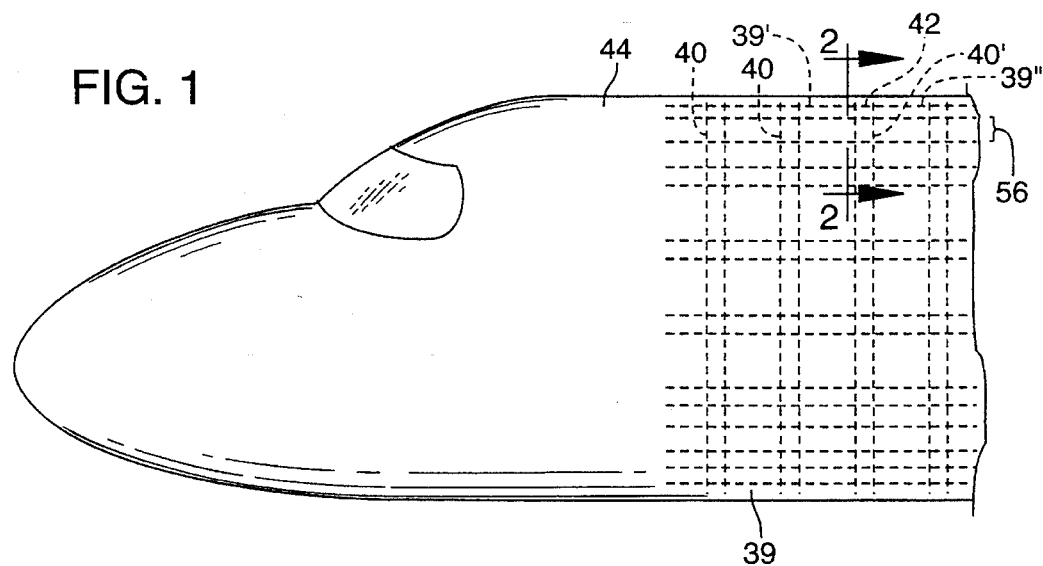
FIG. 1 is a partial view of an aircraft fuselage generally illustrating the construction thereof.

Referring to FIG. 1, a partial view of an aircraft fuselage, the construction thereof may be observed to consist of a series of spaced circumferential members 40 which define the overall cross sectional shape of the aircraft with a series of spaced stringers 39 which run between adjacent circumferential members 40. Stringers 39 run substantially parallel to the longitudinal axis of the aircraft fuselage while the bulkhead members 40 are substantially transverse to the longitudinal axis of the fuselage. A given circumferential member 40' will have a set of forward stringers 39' related thereto and a set of aft stringers 39" related thereto. The forward and aft stringers are joined together and to the circumferential member by a stringer splice fitting 42. The combination of the circumferential members 40, stringers 39 and stringer splice fittings 42 provide a supporting framework structure for the aircraft skin 44, which is secured to the framework. Rather than being provided as a single continuous piece, the skin of the aircraft is constructed of many skin pieces which are suitably joined to one another at the various circumferential members 40 and stringers 39.

Figure 2:
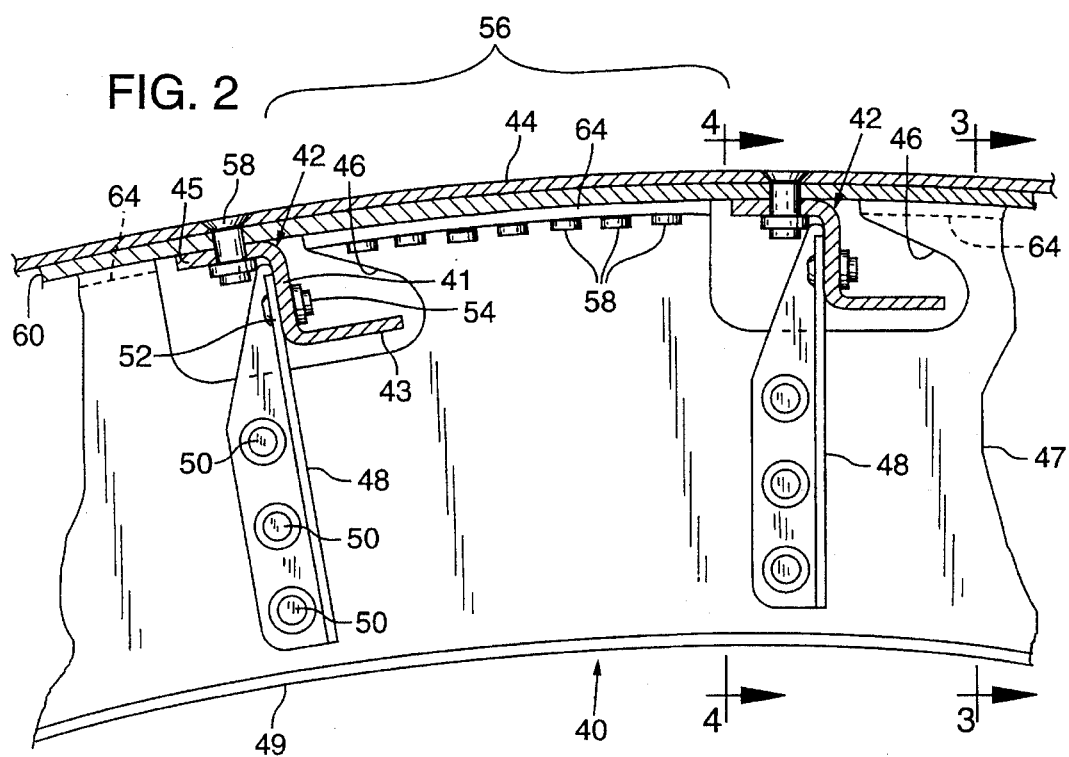
FIG. 2 is a view taken along line 2—2 of FIG. 1 illustrating the attachment of stringers to the bulkhead member.

Referring now to FIG. 2, which is a sectional view taken along line 2—2 of FIG. 1, a portion of the aircraft circumferential member in accordance with the present invention in the crown or upper portion of the aircraft fuselage may be observed in greater detail. The circumferential member or bulkhead member 40, which comprises a central web portion 47 aligned transversely to the longitudinal axis of the aircraft, an inner flange 49 that runs the extent of the bulkhead member along the inner edge of the central web and a series of outer flange portions 64 positioned along the outer edge of the central web, defines the overall curvature of the fuselage. A stringer splice fitting 42 passes through the member 40 via an opening 46 defined within circumferential member 40 at the external side thereof, wherein the external side is indicated as the side of the circumferential member which faces the skin 44. A series of such openings 46 are formed in spaced relation along the extent of member 40 and define the locations of the stringers. A particular stringer splice fitting 42 passing through a given opening 46 comprises a longitudinally aligned straight web portion 41, an inner flange 43 which extends longitudinally along and perpendicular to one edge of the web in a first direction and an outer flange 45 which extends longitudinally in an opposing direction to the first mentioned flange at the other edge of the web. Each stringer splice fitting 42 is fastened to the bulkhead or circumferential member 40 via stringer hanger or clip 48, wherein the stringer clip is secured to the circumferential or bulkhead member and the stringer splice fitting via rivets or other suitable fasteners 50. The stringer clip extends from the central portion of the bulkhead member substantially into opening 46 and a foot 52 (visible in FIG. 6) runs parallel with the direction of stringer splice fitting 42 so as to provide a suitable mating surface against which stringer splice fitting 42 rests. The forward and aft stringers 39' and 39" are fastened to the stringer splice fitting by any suitable means (e.g. rivets, not shown). Fastener 54 thereby securely holds the stringer to the clip and joins the stringer splice fitting (and the forward and aft stringers) to the bulkhead member 40. The area between two stringers associated with a given bulkhead member is suitably designated as a stringer bay 56.

The aircraft skin 44 is joined to the stringers, stringer splice fitting and circumferential bulkhead member via fasteners which suitably comprise a series of rivets 58. In areas where two adjacent skin pieces meet, skin splice plate 60 is provided, disposed between bulkhead member 40 and the aircraft skin 44. The splice plate is also disposed between stringer splice fitting 42 and the external skin 44 in the areas of openings 46. The particular arrangement of the splice plate relative to the skin and stringer/bulkhead construction will be described in greater detail with reference to FIGS. 6 and 7 herein.

Figure 3:
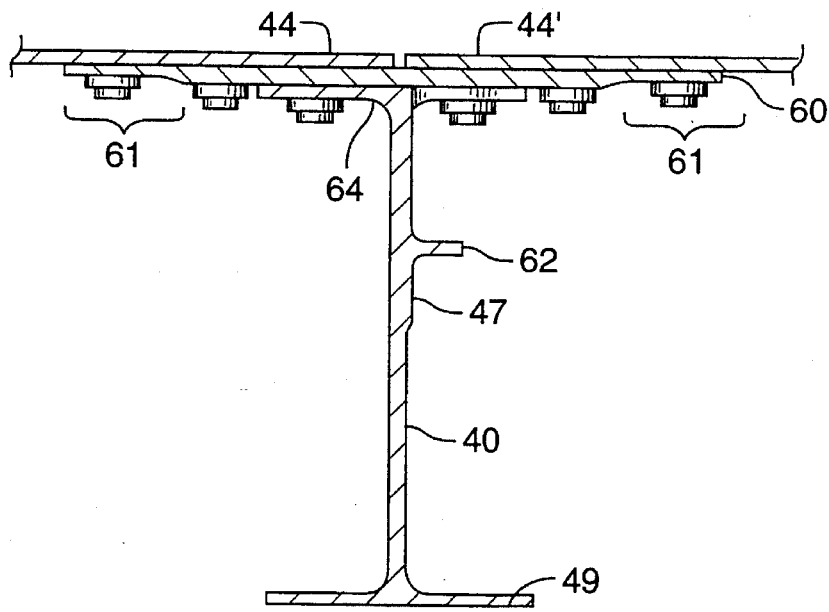
FIG. 3 is a sectional view taken along line 3—3 of FIG. 2 illustrating the bulkhead member, the alternating shear tie foot pattern and the general attachment of two skin pieces.

Referring now to FIG. 3, which is a sectional view of the aircraft fuselage in accordance with the present invention taken along line 3—3 of FIG. 2, the placement of circumferential bulkhead member 40 and the cross sectional construction thereof may be observed in relation to splice plate 60 and adjacent aircraft skin pieces 44 and 44'. In actual construction, the gap between the two adjacent aircraft skin panels is typically filled with a sealant to provide a smooth aerodynamic surface. It will be observed that in FIG. 3, the view is taken in the middle of a stringer bay, so that stringer 39 and stringer splice fitting 42 are not present. Circumferential member 40 is generally of an I-beam shape in cross section with an additional flange 62 provided midway between the upper and lower extent of the central portion of the bulkhead member. It may further be observed in FIG. 3 that the bulkhead member includes a flange portion 64 which provides a shear tie to the skin and splice plate 60. As will be apparent in conjunction with FIGS. 6 and 7, the shear tie is positioned to one side, either forward or aft, of the centerline of the bulkhead member 40. Therefore, while in FIG. 3 the shear tie 64 appears to the left (aft) of the central web 47 of bulkhead member 40, for this particular stringer bay, there is no corresponding shear tie 64 on the right (forward) side of the central web of the circumferential bulkhead member 40. This provides advantages which will be discussed hereinbelow. Splice plate 60 is substantially planar, conforming to the curvature of bulkhead member 40 and the aircraft skin and is of lesser thickness in areas 61 at the distal edges thereof.

Figure 4:
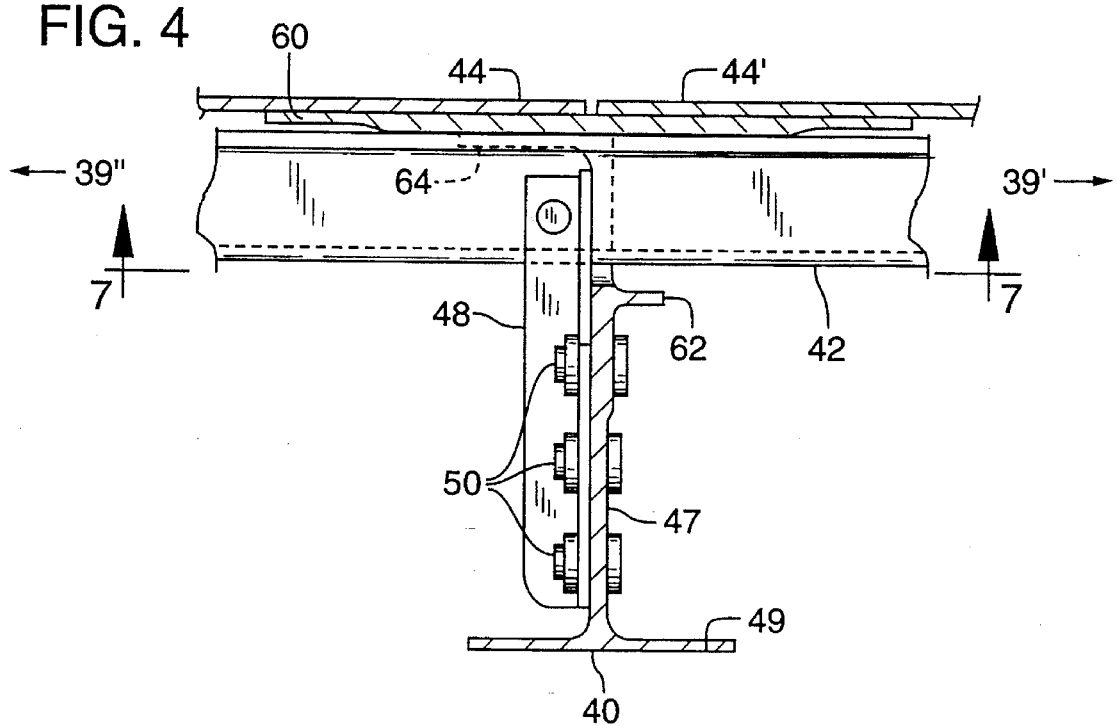
FIG. 4 is a sectional view taken along line 4—4 of FIG. 2 showing stringer placement in relation to the shear tie.
Figure 5:
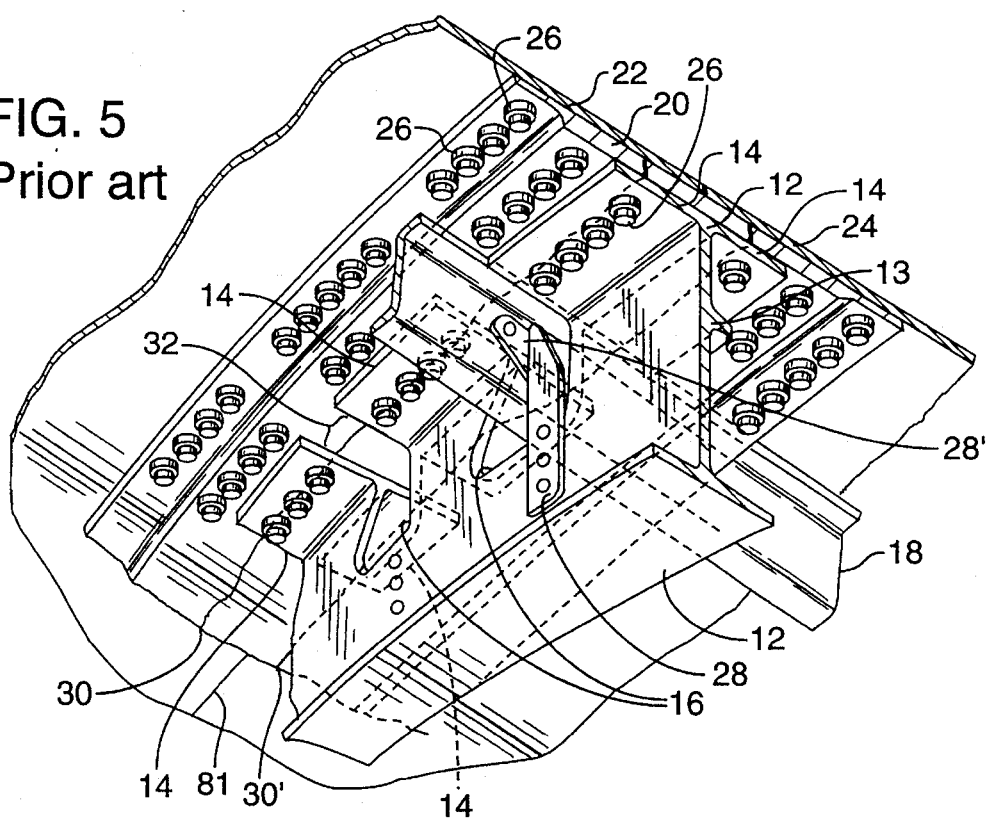
FIG. 5 is a partial perspective view of an aircraft bulkhead frame, stringer, skin and skin splice plate in accordance with the prior art.

Referring now to FIG. 4, which is a sectional view taken along line 4—4 of FIG. 2, the relationship between a particular stringer splice fitting 42, the forward stringer 39', aft stringer 39", circumferential bulkhead member 40 and skin splice plate 60 may be more readily observed. Forward and aft stringers 39' and 39" are to the right and left of FIG. 4 respectively. The presence and absence of shear tie member 64 may also be more readily observed in relation to the forward and aft faces of circumferential bulkhead member 40, wherein in FIG. 4, shear tie 64, illustrated in phantom, is present at the aft side of central web 47 for this particular stringer bay. In the stringer bays adjacent the stringer bay illustrated in FIG. 4, shear tie 64 would be present on the forward side of central web 47. The stringer splice fitting 42 extends beyond the distal edges of the skin splice plate 60 and is coextensive with portions of both forward and aft stringers 39' and 39" providing sufficient mating surfaces between the splice fitting and the stringers to allow the joining thereof, via any suitable means, for example riveting.

Figure 6:
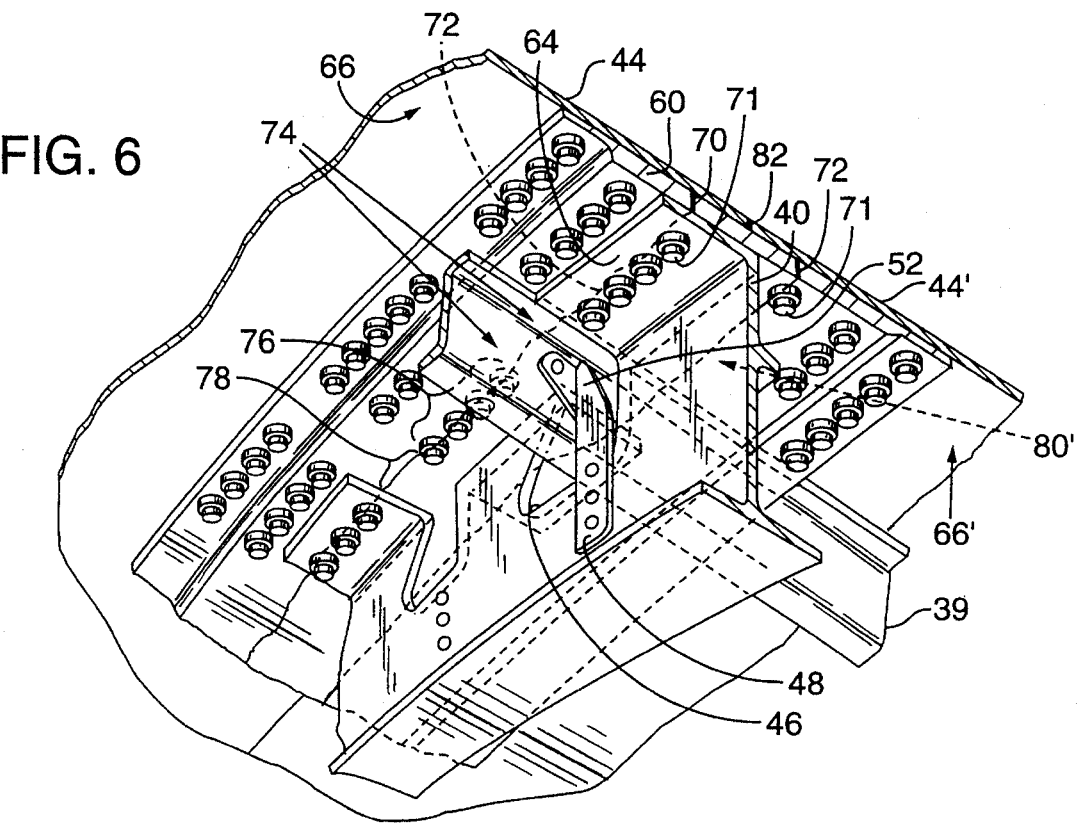
FIG. 6 is a perspective view of a partial bulkhead frame and stringer tie with staggered shear tie footprint pattern in accordance with the present invention.

Referring now to FIG. 6 which is a perspective view of a portion of an aircraft fuselage from the interior thereof as constructed according to the present invention, the advantages of the invention may be better understood. In FIG. 6, the forward aircraft skin 44 and the adjacent aft skin 44' are positioned in adjacent relation to one another. The aircraft skins include inner surfaces 66 and 66' against which splice plate 60 is positioned in substantially parallel abutting relation. The face of splice plate 60 that is oriented away from the aircraft skin receives circumferential member 40 in abutting relation thereto and a series of fasteners (i.e., rivets) are employed to securely fasten the skin, splice plate and circumferential member together. The stepped appearance of splice plate 60 as a result of the reduced thickness of the plate as it extends from the center thereof towards its outer edges may also be observed in FIG. 6. Stringer 39 extends perpendicular to the longitudinal extent of circumferential member 40 and passes through opening 46. In FIG. 6, only one stringer 39 is shown in order to more clearly illustrate the invention; however, it will be understood that each opening 46 in circumferential member 40 will have a corresponding stringer 39 passing therethrough. Further, the existence of stringer splice fitting 42 is assumed but not shown in FIG. 6 for clarity of illustration.

In aircraft construction employing a splice plate where two skins join together, critical failure lines occur at 70 and 72, running substantially along the extent of the innermost row of fasteners 71 relative to the circumferential member 40. Referring still to FIG. 6 and more particularly to failure line 70, it may be observed that in areas indicated by arrows 72 and 74, the failure lines will not be visible during the course of an inspection from the interior of the aircraft fuselage, because, at 72, the circumferential member shear tie 64 covers the failure line making visual inspection impossible. Similarly at position 74, the stringer member 39 (or stringer splice fitting) also covers the failure line, preventing the detection of a crack or other failure in that area. However, according to the present invention, at area 76 the failure line is visible, because in accordance with the present invention the circumferential member shear tie is positioned on the opposite side of the center web of the circumferential member, leaving area 76 uncovered and visible by inspection from the interior of the fuselage. While at area 78 the failure line is visible in FIG. 6, this portion of the failure line would not be visible in actual practice since another stringer 39 would be covering the failure line along this area.

With reference to failure line 72, it will be understood that this failure line is observable in alternate stringer bays from the stringer bays in which failure line 70 is observable. For example, failure line 72 may be observed in area 80, since the circumferential member does not have a shear tie which would cover the failure at that area.

Figure 7:
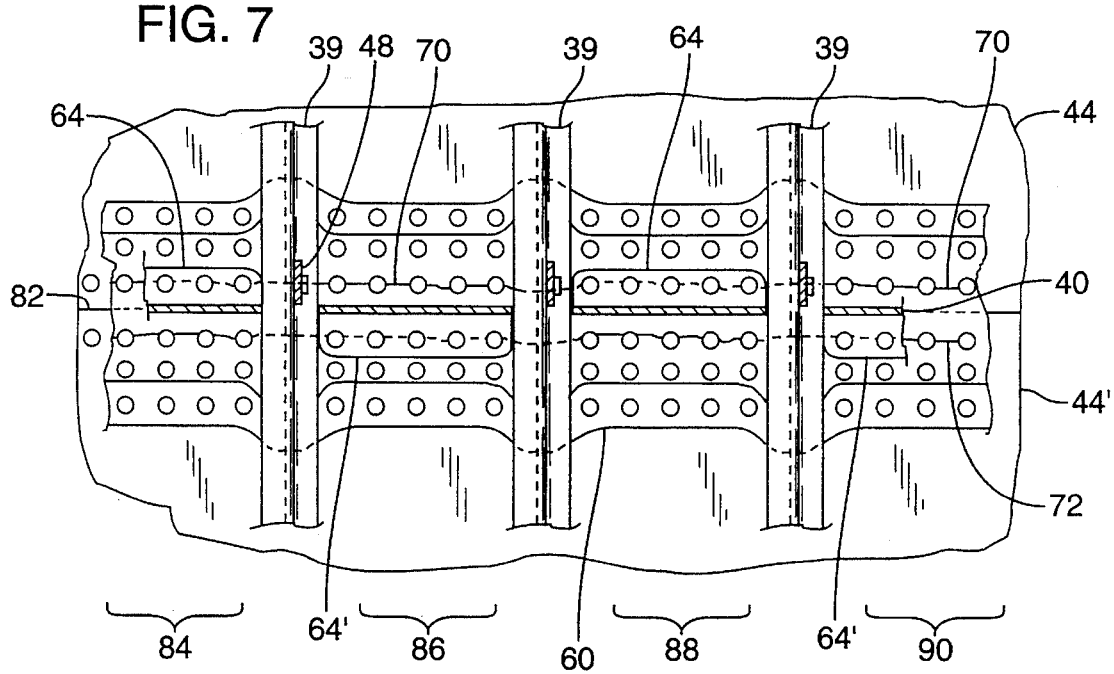
FIG. 7 is a plan view of a portion of an aircraft constructed in accordance with the present invention illustrating skin placement, splicing and shear tie placement.

Referring now to FIG. 7, which is a sectional view taken along line 7—7 of FIG. 4 as viewed perpendicular to the central web of circumferential member 40, the alternating shear tie pattern of the circumferential member may be readily observed. In FIG. 7, three stringers 39 are illustrated in their spaced relation to one another. The areas between each of the stringers define stringer bays 84, 86, 88 and 90.

Failure line 70, which occurs on forward skin 44 adjacent and parallel to the splice line 82, is visible in stringer bays 86 and 90, since forward shear tie 64 of circumferential bulkhead member 40 is not present in those stringer bays. In stringer bays 84 and 88 the flange or foot of shear tie 64 is present on the forward side of the splice joint to provide the appropriate support and fastening between the bulkhead member, the splice plate and the forward skin. The shear ties block the view of failure line 70 in those stringer bays, but since the failure line is clearly visible in stringer bays 86 and 90, the required support and fastening are provided while still enabling easy inspection of the critical fatigue areas. With reference to aft failure line 72, it will be noted that in stringer bays 86 and 90, aft shear tie foot 64' is present and blocks viewing of failure line 72. However in alternate stringer bays 84 and 88, only forward shear tie foot 64 is present, and aft shear tie foot 64' does not cover failure line 72 thereby resulting in easy visual inspection for the existence of the failure line. The plan view shape of splice plate 60 may also be observed in FIG. 7, wherein the splice plate employs substantially straight edges, with slight forward and aft projections at those areas where the splice plate and stringers meet.

Figure 8:
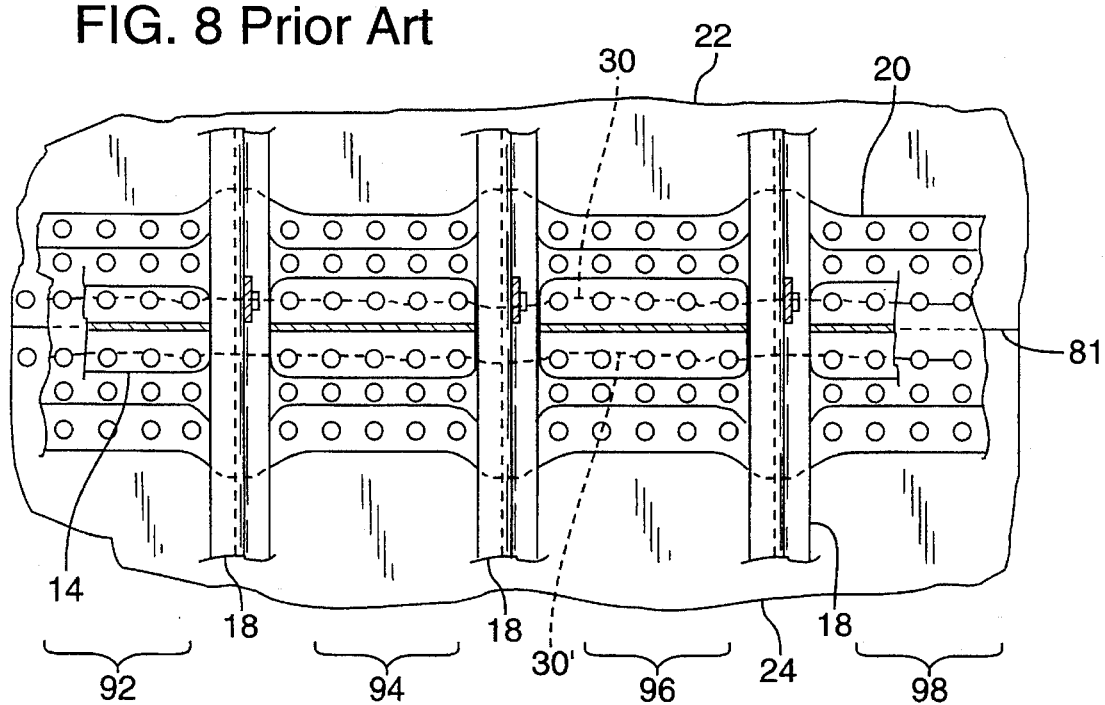
FIG. 8 is a plan view of a portion of an aircraft constructed in accordance with the prior art, illustrating the hidden failure lines.

In contrast, referring now to FIG. 8, which is a view corresponding to that of FIG. 7 as would be observed in accordance with the prior art, it may be observed that shear tie members 14 extend to both the forward and aft sides of the join line 81 between skins 22 and 24. Because of the placement of each of stringers 18 and the shear tie members 14, in each of stringer bays 92, 94, 96 and 98, the failure lines 30 and 30' are obscured and are not adapted to be visually inspected. Therefore, it is necessary to perform expensive, non destructive inspection operations in order to detect the existence of the failures 30 and 30' in aircraft constructed according to the prior art.

In a preferred embodiment of the invention, the alternating shear tie pattern is constructed by building the bulkhead member in accordance with the prior art and then machining the shear tie flanges off one side, e.g. the forward side, of the central web of the bulkhead frame in alternate stringer bays. Then, the shear tie flanges are machined off the aft side of the central web of the bulkhead in those positions where the shear tie flanges have not been removed on the forward side of the web. Alternatively, the bulkhead could be pre-manufactured with the alternating shear tie foot pattern so as to remove the need for the machining step. The construction according to the present invention is most advantageously used in the crown area of an aircraft, where skin splice joint failures are more likely to occur and where early detection is important.

Therefore, aircraft construction in accordance with the present invention advantageously allows visual inspection for cracking or other failures along the critical failure lines in stringer bays at skin splice locations. The need for non destructive inspection is then eliminated or reduced and damage tolerance is improved. Also, the cost of ownership of an aircraft is reduced, since down time is lessened considerably. The skin splice joint weight is advantageously lessened, leading to a lighter aircraft construction.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An aircraft fuselage bulkhead member comprising:

a central web member adapted for placement within an aircraft transverse to the longitudinal axis of the aircraft, said central web member having a forward and an aft face;

at least two first shear tie members positioned in spaced relation to one another and extending a substantial extent only away from the forward face of said central web member; and at least two second shear tie members positioned in spaced relation to one another and extending away from the aft face of said central web member, wherein the longitudinal alignment of a particular first shear tie member is offset from the longitudinal alignment of a corresponding second shear tie member.

2. An aircraft fuselage bulkhead member according to claim 1 wherein said central web member defines an annular shape and said at least two first shear tie members and said at least two second shear tie members define a curved profile.

3. An aircraft fuselage bulkhead member according to claim 1 wherein said at least two first shear tie members and said at least two second shear tie members are located near the crown of the aircraft fuselage.

4. A method of manufacturing an aircraft fuselage bulkhead member comprising the steps of:

providing a central web member having a forward face and an aft face and adapted for placement within an aircraft transverse to the longitudinal axis of the aircraft;

positioning at least two first shear tie members in spaced relation substantially only at the forward face of said central web member; and positioning at least two second shear tie members in spaced relation to one another at the aft face of said central web member, wherein the longitudinal alignment of a given first shear tie member is offset from the longitudinal alignment of a corresponding second shear tie member.

5. A fuselage body skin/stringer circumferential splice comprising:

a first skin member and a second skin member positioned in adjacent relation to one another along a join line;

a splice plate adapted to simultaneously overlay a portion of an internal surface of said first skin member and a portion of an internal surface of said second skin member, said splice plate running substantially coextensively with the join line of said first and second skin members;

a bulkhead member disposed substantially coextensively with the join line of said first and second skin members, wherein said splice plate is positioned between said bulkhead member and said first and second skin members, said bulkhead member abutting said splice plate via plural shear tie members, said shear tie members being disposed in an alternating configuration such that a first shear tie member is positioned substantially to the first lateral side of the join line and a second shear tie member is positioned substantially to the second lateral side of the join line.

6. The fuselage body skin/stringer circumferential splice according to claim 5 wherein said bulkhead member carries openings therein in spaced relation along the extent thereof, said openings defining stringer bays and wherein said first shear tie member is associated with a first stringer bay and said second shear tie member is associated with a second stringer bay.

7. The method according to claim 4 wherein said central web member has at least four pairs of oppositely facing shear tie members and wherein the offset of the longitudinal alignment of said first shear tie members and said second shear tie members is achieved by removing at least two alternating shear tie members from said forward face and removing at least two alternating shear tie members from said aft face wherein the longitudinal alignment of said forward face removed shear tie members is offset from the longitudinal alignment of said aft face removed shear tie members.

* * * * *